United States Patent
Courchay et al.

(10) Patent No.: US 11,597,897 B2
(45) Date of Patent: Mar. 7, 2023

(54) WATER-SOLUBLE FILM AND WATER-SOLUBLE UNIT DOSE ARTICLE MADE THEREFROM

(71) Applicant: The Procter & Gamble Company, Cincinnati, OH (US)

(72) Inventors: Florence Catherine Courchay, Ixelles (BE); Jie Ma, Saint Josse (BE)

(73) Assignee: The Procter & Gamble Company, Cincinnati, OH (US)

(*) Notice: Subject to any disclaimer, the term of this patent is extended or adjusted under 35 U.S.C. 154(b) by 344 days.

(21) Appl. No.: 17/123,868

(22) Filed: Dec. 16, 2020

(65) Prior Publication Data

US 2021/0189303 A1   Jun. 24, 2021

(30) Foreign Application Priority Data

Dec. 19, 2019   (EP) .................................... 19217967

(51) Int. Cl.
| | | |
|---|---|---|
| C11D 1/00 | (2006.01) | |
| C11D 17/00 | (2006.01) | |
| C11D 17/04 | (2006.01) | |
| C08L 29/04 | (2006.01) | |
| C08L 89/00 | (2006.01) | |
| C11D 11/00 | (2006.01) | |

(52) U.S. Cl.
CPC ............ *C11D 17/045* (2013.01); *C08L 29/04* (2013.01); *C08L 89/005* (2013.01); *C11D 1/00* (2013.01); *C11D 11/0017* (2013.01); *C11D 11/0023* (2013.01); *C11D 17/042* (2013.01); *C11D 17/043* (2013.01); *C11D 17/044* (2013.01)

(58) Field of Classification Search
CPC ....... C11D 1/00; C11D 17/042; C11D 17/043; C11D 17/044
USPC ................................... 510/296, 439
See application file for complete search history.

(56) References Cited

U.S. PATENT DOCUMENTS

2017/0360676 A1* 12/2017 Dihora ................ A61K 8/0241
2019/0275499 A1*  9/2019 Liang ...................... B01J 23/10

FOREIGN PATENT DOCUMENTS

EP            2570474 A1      3/2013

OTHER PUBLICATIONS

Bedriye U Durmaz et al—Development and characterization of polyvinyl alcohol and casein blend films, Polymer International, vol. 68. no. 6, Mar. 25, 2019 Jun. 1, 2019, pp. 1140-1146.
CM05159M PCT Search Report and Written Opinion for PCT/US2020/065455 dated Apr. 1, 2021.
Extended European Search Report and Search Opinion; Application No. 19217967.9; dated Mar. 9, 2020; 7 pages.
Extended European Search Report and Search Opinion; Application No. 20215075.1; dated May 19, 2021; 8 pages.

* cited by examiner

*Primary Examiner* — Gregory R Delcotto
(74) *Attorney, Agent, or Firm* — Andrew J. Mueller

(57) ABSTRACT

Water-soluble film and unit dose articles made therefrom, where the water-soluble film includes a water-soluble polymer, where the water-soluble polymer includes a blend of a caseinate polymer and a polyvinyl alcohol homopolymer.

19 Claims, 1 Drawing Sheet

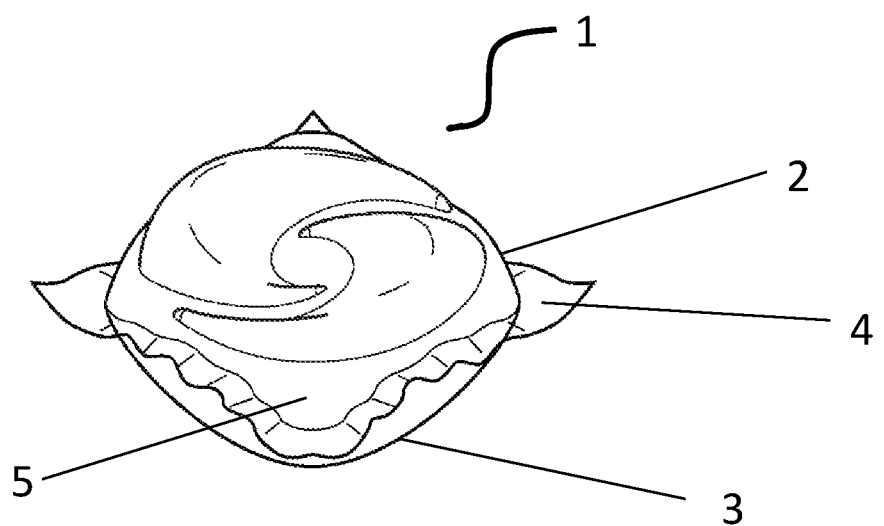

WATER-SOLUBLE FILM AND WATER-SOLUBLE UNIT DOSE ARTICLE MADE THEREFROM

FIELD OF THE INVENTION

The present disclosure relates to water-soluble film and unit dose articles made therefrom, where the water-soluble film includes a water-soluble polymer, where the water-soluble polymer includes a blend of a caseinate polymer and a polyvinyl alcohol homopolymer. The present disclosure also relates to unit dose articles made from such film.

BACKGROUND OF THE INVENTION

Water-soluble films comprising water-soluble polyvinyl alcohol homo- and/or copolymers have been known for a long time and have been used in many applications.

One of the possible application fields of such water-soluble films are water-soluble laundry unit dose detergent articles. Without wishing to be bound by theory, the water-soluble unit dose article comprises a water-soluble film and a unitized dose of a treatment composition which is housed within one or more compartments within the unit dose article. Upon addition to water, the water-soluble film dissolves and/or disintegrates and releases the treatment composition into the water.

While these water-soluble films are required to dissolve completely under use conditions in order not to leave undissolved film residues on the laundry items, even when exposed to very stressed wash conditions such as short and/or cold and/or low water washes, premature dissolution or disintegration upon accidental exposure to water prior to use is to be avoided. This has been found to be very challenging, e.g. water soluble films that show superior dissolution profiles tend to also be very sensitive to premature rupture upon accidental exposure to water, while films that demonstrate low sensitivity to premature rupture also seem to suffer incomplete film dissolution under stressed water conditions. As such there is still a need for water soluble films with improved resistance to premature rupturing upon accidental exposure to water prior to use, while still securing full film dissolution during use even under stressed wash conditions. In addition, a suitable film mechanical strength profile needs to be maintained to enable sufficient film deformation upon water-soluble unit dose article making while achieving strong and tight, rather than floppy, water soluble unit dose articles at the end of their making process.

SUMMARY OF THE INVENTION

The present disclosure relates to a water-soluble film, where the water-soluble film includes a water-soluble polymer, where the water-soluble polymer includes a blend of a caseinate polymer and a polyvinyl alcohol homopolymer, and where the polyvinyl alcohol homopolymer has an average percentage degree of hydrolysis of from 75% to 100%, and where the polyvinyl alcohol homopolymer has an average viscosity of from 1 to 30 mPas, and where the viscosity is measured as a 4% aqueous solution in demineralized water at 20° C.

The present disclosure also relates to a water-soluble unit dose article that includes a water-soluble film according to the present disclosure, a treatment composition, and at least one internal compartment, where the treatment composition is contained within the at least one compartment.

BRIEF DESCRIPTION OF THE DRAWINGS

FIG. 1 is a water-soluble unit dose article according to the present invention.

DETAILED DESCRIPTION OF THE INVENTION

It has been surprisingly found that the film according to the present disclosure comprising a polymeric blend of polyvinyl alcohol homopolymer and caseinate polymer provided for both improved robustness against premature rupture and superior film dissolution, with suitable mechanical properties for use for water soluble unit dose article applications, when compared to related polyvinyl alcohol homopolymer based films in absence of the caseinate polymer. Partial replacement of polyvinyl alcohol resin by caseinate polymeric resin also increases the bio-derived content inside of water-soluble film compositions.

Water-Soluble Film

The present disclosure relates to a water-soluble film. The water-soluble film comprises a water-soluble polymer, wherein the water-soluble polymer comprises a blend of a caseinate polymer and a polyvinyl alcohol homopolymer. The caseinate polymer is described in more detail below and the polyvinyl alcohol homopolymer is described in more detail below.

The water-soluble film of the present invention is soluble or dispersible in water. The water-soluble film preferably has a thickness of between 30 µm and 100 µm, preferably between 50 µm and 90 µm, most preferably between 60 µm and 85 µm.

Preferably, the water-soluble film has a water-solubility of at least 50%, preferably at least 75% or even at least 95%, as measured by the method set out here after using a glass-filter with a maximum pore size of 20 microns:

5 grams±0.1 gram of film material is added in a pre-weighed 3 L beaker and 2 L±5 ml of distilled water is added. This is stirred vigorously on a magnetic stirrer, Labline model No. 1250 or equivalent and 5 cm magnetic stirrer, set at 600 rpm, for 30 minutes at 30° C. Then, the mixture is filtered through a folded qualitative sintered-glass filter with a pore size as defined above (max. 20 micron). The water is dried off from the collected filtrate by any conventional method, and the weight of the remaining material is determined (which is the dissolved or dispersed fraction). Then, the percentage solubility or dispersability can be calculated.

Preferably, the weight ratio of caseinate polymer to polyvinylalcohol homopolymer is between 25:75 and 95:5, preferably between 30:70 and 80:20, more preferably between 35:65 and 60:40, most preferably between 40:60 and 50:50. Preferably, the weight percentage of the caseinate polymer and the polyvinyl alcohol homopolymer add up to 100% by weight of the polymeric resin in the water-soluble film. The skilled person in the art will know how to prepare the polymeric resin and each individual polyvinyl alcohol polymer.

The water-soluble polymer may be present between 50% and 95%, preferably between 55% and 90%, more preferably between 60% and 80% by weight of the film.

Preferably, the water-soluble film comprises a non-aqueous plasticizer. Preferably, the non-aqueous plasticizer is selected from polyols, sugar alcohols, and mixtures thereof. Suitable polyols include polyols selected from the group consisting of glycerol, diglycerin, ethylene glycol, diethylene glycol, triethyleneglycol, tetraethylene glycol, polyethylene glycols up to 400 MW, neopentyl glycol, 1,2-propylene glycol, 1,3-propanediol, dipropylene glycol, polypropylene glycol, 2-methyl-1,3-propanediol, trimethylolpropane and polyether polyols, or a mixture thereof. Suitable sugar alcohols include sugar alcohols selected from the group consisting of isomalt, maltitol, sorbitol, xylitol, erythritol, adonitol, dulcitol, pentaerythritol and mannitol, or a mixture thereof. More preferably the non-aqueous plasticizer is selected from glycerol, 1,2-propanediol, dipropylene glycol, 2-methyl-1,3-propanediol, trimethylolpropane, triethyleneglycol, polyethyleneglycol, sorbitol, or a mixture thereof, most preferably selected from glycerol, sorbitol, trimethylolpropane, dipropylene glycol, and mixtures thereof. One particularly suitable plasticizer system includes a blend of glycerol, sorbitol and trimethylol propane. Another particularly suitable plasticizer system includes a blend of glycerin, dipropylene glycol, and sorbitol. Preferably, the film comprises between 5% and 50%, preferably between 10% and 40%, more preferably between 20% and 30% by weight of the film of the non-aqueous plasticizer.

Preferably, the water-soluble film according to the invention comprises a surfactant. Preferably, the water-soluble film comprises a surfactant in an amount between 0.1% and 2.5%, preferably between 1% and 2% by weight of the water-soluble film. Suitable surfactants can include the nonionic, cationic, anionic and zwitterionic classes. Suitable surfactants include, but are not limited to, polyoxyethylenated polyoxypropylene glycols, alcohol ethoxylates, alkylphenol ethoxylates, tertiary acetylenic glycols and alkanolamides (nonionics), polyoxyethylenated amines, quaternary ammonium salts and quaternized polyoxyethylenated amines (cationics), and amine oxides, N-alkylbetaines and sulfobetaines (zwitterionics). Other suitable surfactants include dioctyl sodium sulfosuccinate, lactylated fatty acid esters of glycerol and propylene glycol, lactylic esters of fatty acids, sodium alkyl sulfates, polysorbate 20, polysorbate 60, polysorbate 65, polysorbate 80, lecithin, acetylated fatty acid esters of glycerol and propylene glycol, and acetylated esters of fatty acids, and combinations thereof.

Preferably the water-soluble film according to the invention comprises lubricants/release agents. Suitable lubricants/release agents can include, but are not limited to, fatty acids and their salts, fatty alcohols, fatty esters, fatty amines, fatty amine acetates and fatty amides. Preferred lubricants/release agents are fatty acids, fatty acid salts, and fatty amine acetates. the amount of lubricant/release agent in the water-soluble film is in a range of from 0.02% to 1.5%, preferably from 0.1% to 1% by weight of the water-soluble film.

Preferably, the water-soluble film comprises fillers, extenders, antiblocking agents, detackifying agents or a mixture thereof. Suitable fillers, extenders, antiblocking agents, detackifying agents or a mixture thereof include, but are not limited to, starches, modified starches, crosslinked polyvinylpyrrolidone, crosslinked cellulose, microcrystalline cellulose, silica, metallic oxides, calcium carbonate, talc and mica. Preferred materials are starches, modified starches and silica. Preferably, the amount of filler, extender, antiblocking agent, detackifying agent or mixture thereof in the water-soluble film is in a range of from 0.1% to 25%, preferably from 1% to 10%, more preferably from 2% to 8%, most preferably from 3% to 5% by weight of the water-soluble film. In the absence of starch, one preferred range for a suitable filler, extender, antiblocking agent, detackifying agent or mixture thereof is from 0.1% to 1%, preferably 4%, more preferably 6%, even more preferably from 1% to 4%, most preferably from 1% to 2.5%, by weight of the water-soluble film.

Preferably the water-soluble film according to the invention has a residual moisture content of at least 4%, more preferably in a range of from 4% to 15%, even more preferably of from 5% to 10% by weight of the water-soluble film as measured by Karl Fischer titration.

Preferably the water-soluble film according to the invention comprises an aversive agent, preferably a bittering agent. Suitable bittering agents include, but are not limited to, naringin, sucrose octaacetate, quinine hydrochloride, denatonium benzoate, or mixtures thereof. Any suitable level of aversive agent may be used in the film. Suitable levels include, but are not limited to, 1 ppm to 5000 ppm, or even 100 ppm to 2500 ppm, or even 250 ppm to 2000 rpm in reference to the water-soluble film.

The water-soluble film according to the invention may be opaque, transparent or translucent. The water-soluble film according to the invention may comprise a printed area. The area of print may be achieved using standard techniques, such as flexographic printing or inkjet printing.

The water-soluble film or water-soluble unit dose article according to the invention or both may be coated with a lubricating agent. Preferably, the lubricating agent is selected from talc, zinc oxide, silicas, siloxanes, zeolites, silicic acid, alumina, sodium sulphate, potassium sulphate, calcium carbonate, magnesium carbonate, sodium citrate, sodium tripolyphosphate, potassium citrate, potassium tripolyphosphate, calcium stearate, zinc stearate, magnesium stearate, starch, modified starches, clay, kaolin, gypsum, cyclodextrins or mixtures thereof.

Caseinate Polymer

Casein is a protein derived from milk which is relatively insoluble in water. It is often obtained by precipitation following addition of an acid to milk (casein acid) or rennet (rennet casein). Caseinate is defined as a salt of casein; its counterion typically selected from the group consisting of calcium, potassium, ammonium, magnesium and sodium, or mixtures thereof, most preferably sodium.

The water-soluble film according to the present invention comprises a water-soluble polymer comprising a blend of caseinate polymer and polyvinyl alcohol homopolymer wherein the caseinate polymer is preferably selected from alkaline metal salts of caseinate, more preferably sodium caseinate.

While it is stated the polymer according to the present invention comprises caseinate, in practice this caseinate will be a mixture of caseinate and casein impurity. The relative weight ratio of the casein impurity to caseinate being a function of the pH of the water-soluble film. Therefore, when caseinate is stated herein, this encompasses pure sodium caseinate as well as levels of casein impurity.

Without wishing to be bound by theory, casein consists of a(s1)-, a(s2)-, β- and κ-casein. Like any protein, casein is made up of hundreds of individual amino acids, each of which may have a positive or a negative charge, depending on the pH of the surrounding system. At some pH value, all the positive charges and all the negative charges on the casein remain in balance (i.e., the net charge on the protein is zero); this pH value is known as the isoelectric point (IEP), which is 4.6 for casein. The IEP is the pH at which the protein is least soluble. Therefore, to make the casein soluble it is used in the caseinate form, as the alkali conditions make the casein soluble.

Polyvinyl Alcohol Homopolymer

The water-soluble film comprises a polyvinyl alcohol homopolymer.

Without wishing to be bound by theory, the term "homopolymer" generally includes polymers having a single type of monomeric repeating unit (e.g., a polymeric chain consisting of or consisting essentially of a single monomeric repeating unit). For the particular case of polyvinylalcohol, the term "homopolymer" includes polymers having a distribution of vinyl alcohol monomer units and optionally vinyl acetate monomer units, depending on the degree of hydrolysis (e.g., a polymeric chain consisting of or consisting essentially of vinyl alcohol and vinyl acetate monomer units). In the limiting case of 100% hydrolysis, a polyvinylalcohol homopolymer can include a true homopolymer having only vinyl alcohol units.

Without wishing to be bound by theory, the term "copolymer" generally includes polymers having two or more types of monomeric repeating units (e.g., a polymeric chain consisting of or consisting essentially of two or more different monomeric repeating units, whether as random copolymers, block copolymers, etc.). For the particular case of polyvinylalcohol, the term "copolymer" (or "polyvinylalcohol copolymer") includes copolymers having a distribution of vinyl alcohol monomer units and optionally vinyl acetate monomer units, depending on the degree of hydrolysis, as well as at least one other type of monomeric repeating unit (e.g., a ter- (or higher) polymeric chain consisting of or consisting essentially of vinyl alcohol monomer units, vinyl acetate monomer units, and one or more other monomer units, for example anionic or further nonionic monomer units). In the limiting case of 100% hydrolysis, a polyvinylalcohol copolymer can include a copolymer having vinyl alcohol units and one or more other monomer units, but no vinyl acetate units.

The polyvinyl alcohol homopolymer has an average percentage degree of hydrolysis of from 75% to 100%, preferably of from 80% to 95%, most preferably of from 85% to 90%. A person skilled in the art will know how to measure the degree of hydrolysis of a polyvinyl alcohol homopolymer. A suitable test method to measure the degree of hydrolysis is as according to standard method JIS K6726.

The polyvinyl alcohol homopolymer has an average viscosity of from 1 to 30 mPas, more preferably from 5 to 25 mPas, most preferably from 10 to 25 mPas, wherein the viscosity is measured as a 4% aqueous solution in demineralized water at 20° C. Throughout this invention the viscosity of any polyvinyl alcohol polymer may be determined by measuring a freshly made solution using a Brookfield LV type viscometer with UL adapter as described in British Standard EN ISO 15023-2:2006 Annex E Brookfield Test method. It is standard practice to state the viscosity of 4% aqueous polyvinyl alcohol solutions at 20° C.

Suitable polyvinyl alcohol homopolymers could be obtained from Sigma Aldrich under the Mowiol tradename.

Preferably, the water soluble polymer is present at 60% to 80% by weight of the water-soluble film according to the invention and consists of a mixture of sodium caseinate polymer and polyvinyl alcohol homopolymer in a 40:60 to 50:50 weight ratio, in which the polyvinyl alcohol homopolymer has an average percentage degree of hydrolysis of from 85% to 90% and an average viscosity of from 10 to 20 mPas as measured as a 4% aqueous solution in demineralized water at 20° C.

Method of Making Film

The water-soluble film according to the present disclosure may be formed by admixing, co-casting, or welding the caseinate polymer and polyvinyl alcohol homopolymer according to the types and amounts described herein, together with the preferred and optional secondary additives described herein. If the polymers are first admixed then the water-soluble film is preferably formed by casting the resulting admixture (e.g., along with other plasticizers and other additives) to form a film. If the polymers are welded, the water-soluble film can be formed by, for example, solvent or thermal welding. Another aspect is characterized by the water-soluble film being formed by extrusion, for example, blown extrusion. Most preferably the water-soluble films according to the invention are prepared by solvent casting.

Water-Soluble Unit Dose Article

The present disclosure also relates to a water-soluble unit dose article comprising a water-soluble film according to the present disclosure, a treatment composition, and at least one internal compartment, wherein the treatment composition is contained within the at least one compartment. The treatment composition is described in more detail below.

The water-soluble unit dose article comprises the water-soluble film shaped such that the unit-dose article comprises at least one internal compartment surrounded by the water-soluble film. The unit dose article may comprise a first water-soluble film and a second water-soluble film sealed to one another such to define the internal compartment. The water-soluble unit dose article is constructed such that the treatment composition does not leak out of the compartment during storage. However, upon addition of the water-soluble unit dose article to water, the water-soluble film dissolves and releases the contents of the internal compartment into the wash liquor.

The compartment should be understood as meaning a closed internal space within the unit dose article, which holds the detergent composition. During manufacture, a first water-soluble film may be shaped to comprise an open compartment into which the treatment composition is added. A second water-soluble film is then laid over the first film in such an orientation as to close the opening of the compartment. The first and second films are then sealed together along a seal region.

The unit dose article may comprise more than one compartment, even at least two compartments, or even at least three compartments. The compartments may be arranged in superposed orientation, i.e. one positioned on top of the other. In such an orientation the unit dose article will comprise three films: top, middle and bottom. Alternatively, the compartments may be positioned in a side-by-side orientation, i.e. one orientated next to the other. The compartments may even be orientated in a 'tyre and rim' arrangement, i.e. a first compartment is positioned next to a second compartment, but the first compartment at least partially surrounds the second compartment but does not completely enclose the second compartment. Alternatively, one compartment may be completely enclosed within another compartment.

Wherein the unit dose article comprises at least two compartments, one of the compartments may be smaller than the other compartment. Wherein the unit dose article comprises at least three compartments, two of the compartments may be smaller than the third compartment, and preferably the smaller compartments are superposed on the larger compartment. The superposed compartments preferably are orientated side-by-side.

Preferably, the water-soluble unit dose article comprises at least two compartments, preferably at least three compartments, even more preferably at least four compartments, most preferably wherein the water-soluble unit dose article comprises a first compartment and at least a second compartment superposed onto the first compartment, more preferably at least a third compartment orientated side-by-side with respect to the second compartment and the second compartment and the third compartments are superposed onto the first compartment, even more preferably at least a fourth compartment orientated side-by-side with respect to the second compartment and third compartment and the second compartment, the third compartment and the fourth compartments are superposed onto the first compartment.

In a multi-compartment orientation, the detergent composition may be comprised in at least one of the compartments. It may for example be comprised in just one compartment, or may be comprised in two compartments, or even in three compartments, or even in all available compartments.

Each compartment may comprise the same or different compositions. The different compositions could all be in the same form, or they may be in different forms.

The water-soluble unit dose article may comprise at least two internal compartments, wherein the detergent composition is comprised in at least one of the compartments, preferably wherein the unit dose article comprises at least three compartments, wherein the detergent composition is comprised in at least one of the compartments.

The water-soluble unit dose article according to the invention may comprise at least one water-soluble film according to the invention. Alternatively, the water-soluble unit dose article according to the invention may comprise at least two or even at least three water-soluble films according to the invention. Alternatively, the water-soluble unit dose article according to the invention solely comprises water-soluble films which are according to the invention, i.e. not comprising any water-soluble films outside the scope of the invention. Preferably, water-soluble mono-compartment unit dose articles or water-soluble multi-compartment unit dose articles in which the multiple compartments are in a side by side configuration are created in which both the bottom and top water-soluble films enclosing the individual compartment(s) are water-soluble films according to the invention. Alternatively, either the top or the bottom water-soluble film is according to the invention. Water-soluble unit dose articles may be created with compartments in a superposed configuration. Under this configuration each of the top, bottom and middle water-soluble film(s) can be water-soluble films according to the invention. Alternatively, one, for example, solely the middle water-soluble film or solely the top water-soluble film or solely the bottom water-soluble film, or a combination of any of these water-soluble films can be a water-soluble film according to the invention while the remaining water-soluble film(s) is (are) outside the scope of the invention. Preferably, all water-soluble films comprised within the water-soluble unit dose article are water-soluble films according to the invention. These water-soluble films according to the invention could be chemically and physically the same, or alternatively could be chemically and/or physically different. By "different" we mean the first water-soluble film is intended to have at least one chemical and/or physical characteristic different to that of the second water-soluble film. This characteristic can be by selecting a different polymeric resin, the polymeric resin for example varying in average individual polymer solution viscosity, average individual polymer degree of hydrolysis, ratio between the first and the second water-soluble polymers, or mixtures thereof. 'Targeted averages' take into consideration the standard polymer variation inherent to any manufacture process. Alternatively, this characteristic can be by varying the relative content of the individual components inside the water-soluble film such as polymeric resin to plasticizer content or water content, or even varying the exact chemistry of the additives. The "different" characteristic is assessed for the starting films prior to deformation, e.g. differences in water-soluble film content as a consequence of a deformation action, exposure to encapsulated detergent composition resulting in exchange of actives between film and the detergent composition, as well as actives exchange with surrounding storage environment are excluded in this assessment.

FIG. 1 discloses a water-soluble unit dose article (1) according to the present invention. The water-soluble unit dose article (1) comprises a first water-soluble film (2) and a second water-soluble film (3) which are sealed together at a seal region (4). The detergent composition (5) is comprised within the water-soluble soluble unit dose article (1).

Treatment Composition

The treatment composition may be selected from laundry detergent composition, laundry softening composition, automatic dishwashing composition, hard surface cleaning composition or a mixture thereof, preferably a laundry detergent composition, preferably the treatment composition is a liquid, a powder, or a mixture thereof, preferably a liquid composition.

The term liquid includes a gel, a solution, a dispersion, a paste or a mixture thereof.

By powder we herein mean the treatment composition may comprise solid particulates or may be a single homogenous solid. Preferably, the powder treatment composition comprises particles. This means the powder treatment composition comprises individual solid particles as opposed to the solid being a single homogenous solid. The particles may be free-flowing or may be compacted, preferably free-flowing.

Preferably, the treatment composition is a laundry detergent composition, most preferably a liquid laundry detergent composition.

The laundry detergent composition can be used in a fabric hand wash operation or may be used in an automatic machine fabric wash operation, preferably an automatic machine fabric wash operation.

Preferably, the treatment composition comprises a non-soap surfactant, wherein the non-soap surfactant comprises an anionic non-soap surfactant and a non-ionic surfactant. Preferably, the treatment composition comprises between 10% and 60%, more preferably between 20% and 55% by weight of the treatment composition of the non-soap surfactant.

The weight ratio of non-soap anionic surfactant to non-ionic surfactant may be from 1:1 to 20:1, preferably from 3:1 to 17.5:1, more preferably from 5:1 to 15:1, most preferably from 7.5:1 to 12.5:1.

Preferably, the non-soap anionic surfactant comprises linear alkylbenzene sulphonate, alkyl sulphate or a mixture thereof. The weight ratio of linear alkylbenzene sulphonate to alkyl sulphate is from 1:2 to 9:1, preferably from 1:1 to 7:1, more preferably from 1.25:1 to 5:1, most preferably from 1.4:1 to 3:1.

Exemplary linear alkylbenzene sulphonates are $C_{10}$-$C_{16}$ alkyl benzene sulfonic acids, or $C_{11}$-$C_{14}$ alkyl benzene sulfonic acids. By 'linear', we herein mean the alkyl group is linear. Alkyl benzene sulfonates are well known in the art.

The alkyl sulphate anionic surfactant may comprise alkoxylated alkyl sulphate or non-alkoxylated alkyl sulphate or a mixture thereof. The alkoxylated alkyl sulphate anionic surfactant preferably is an ethoxylated alkyl sulphate anionic surfactant.

The alkyl sulphate anionic surfactant may comprise an ethoxylated alkyl sulphate anionic surfactant, preferably with a mol average degree of ethoxylation from 1 to 5, more preferably from 1 to 3, most preferably from 2 to 3.

The alkyl sulphate anionic surfactant may comprise a non-ethoxylated alkyl sulphate and an ethoxylated alkyl sulphate wherein the mol average degree of ethoxylation of the alkyl sulphate anionic surfactant is from 1 to 5, more preferably from 1 to 3, most preferably from 2 to 3.

The alkyl fraction of the alkyl sulphate anionic surfactant can preferably be derived from fatty alcohols, oxo-synthesized alcohols, guerbet alcohols, or mixtures thereof.

Preferably, the treatment composition comprises between 10% and 50%, more preferably between 15% and 45%, even more preferably between 20% and 40%, most preferably between 30% and 40% by weight of the treatment composition of the non-soap anionic surfactant.

Preferably, the non-ionic surfactant is selected from alcohol alkoxylate, an oxo-synthesised alcohol alkoxylate, Guerbet alcohol alkoxylates, alkyl phenol alcohol alkoxylates or a mixture thereof.

The treatment composition preferably comprises between 0.01% and 10%, preferably between 0.01% and 8%, more preferably between 0.1% and 6%, most preferably between 0.15% and 5% by weight of the treatment composition of a non-ionic surfactant.

Preferably, the treatment composition comprises between 1.5% and 20%, more preferably between 2% and 15%, even more preferably between 3% and 10%, most preferably between 4% and 8% by weight of the treatment composition of soap, preferably a fatty acid salt, more preferably an amine neutralized fatty acid salt, wherein preferably the amine is an alkanolamine more preferably selected from monoethanolamine, diethanolamine, triethanolamine or a mixture thereof, more preferably monoethanolamine.

Preferably, the treatment composition is a liquid treatment composition, more preferably the liquid treatment composition comprises less than 15%, more preferably less than 12%, even more preferably from 1% to 12%, most preferably from 5% to 12% by weight of the liquid treatment composition of water.

Preferably, the treatment composition is a liquid treatment composition comprising a non-aqueous solvent selected from 1,2-propanediol, dipropylene glycol, tripropyleneglycol, glycerol, sorbitol, polyethylene glycol or a mixture thereof. Preferably, the liquid treatment composition comprises between 10% and 40%, preferably between 15% and 30% by weight of the liquid treatment composition of the non-aqueous solvent.

Preferably the treatment composition comprises a perfume.

Preferably, the treatment composition comprises an adjunct ingredient selected from the group comprising builders including enzymes, citrate, bleach, bleach catalyst, dye, hueing dye, brightener, cleaning polymers including alkoxylated polyamines and polyethyleneimines, soil release polymer, surfactant, solvent, dye transfer inhibitors, chelant, encapsulated perfume, polycarboxylates, structurant, pH trimming agents, and mixtures thereof.

Those skilled in the art will know how to formulate and make a suitable treatment composition using known knowledge and techniques. The treatment composition may comprise common detergent ingredients including surfactants, polymers, bleach, enzymes, perfumes, dyes, structing agents, fillers, water or a mixture thereof.

Those skilled in the art will be aware of known techniques to make a water-soluble unit dose article according to the present invention.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

EXAMPLES

Test Methods:

1. Film Disintegration Time:

The cold water film disintegration profile of the different sodium caseinate/polyvinyl alcohol homopolymer based water-soluble films has been determined following the MSTM-205 Disintegration protocol, executed in 10° C. demineralized water. Within this test the average film rupture time (in seconds) for 3 replicates has been recorded.

2. Film Dissolution Time:

The cold water dissolution profile of the different sodium caseinate/polyvinyl alcohol homopolymer based water-soluble films has been determined following the MSTM-119 Standard Test Method for Residue with Dissolution Chamber by Monosol, executed in 20° C. demineralized water. Within this test the average % of dissolved film after 10 minutes film in water immersion for 3 replicates has been recorded.

3. % Tensile Strain at Break:

The water-soluble film test samples were analyzed for % tensile strain at break as follows. The procedure includes the determination of % tensile strain at break according to ASTM D 882 ("Standard Test Method for Tensile Properties of Thin Plastic Sheeting"). An INSTRON tensile testing apparatus (Model 5544 Tensile Tester or equivalent—Instron Industrial Products, 825 University Ave., Norwood, Mass. 02062-2643) was used for the collection of film data. Five test specimens, each cut with reliable cutting tools (e.g. JDC precision sample cutter, Model 1-10, from Thwing Albert Instrument Company, Philadelphia, Pa. U.S.A.) to ensure dimensional stability and reproducibility, were tested. Water-soluble films were pre-conditioned to testing environmental conditions for 24 h. Tests were conducted in the standard laboratory atmosphere of 20° C. and 33% relative humidity. 1 inch-wide (2.54 cm) samples of a single film sheet having a thickness of 3.0+/−0.15 mil (or 76.2+/−3.8 μm) were prepared. The sample was then transferred to the INSTRON tensile testing machine to proceed with testing. The tensile testing machine was prepared according to manufacturer instructions, equipped with a 500 N load cell, and calibrated. The correct grips and faces were fitted (INSTRON grips having model number 2702-032 faces, which are rubber coated and 25 mm wide, or equivalent). The samples were mounted into the tensile testing machine, elongated at a rate of 1N/min, and analyzed to determine the stress-strain curve. The % tensile strain at break is extracted from the stress-strain curve, e.g. this data is the % tensile strain at which the film breaks (the higher the better, preferably >150%, more preferably >200%, most preferably >250%). The average of 3 test specimens was calculated and reported.

Test Materials:
Starting Polymer Materials:
  PVA homopolymer: Mowiol 18/88 (ex Sigma Aldrich)
  Sodium caseinate: Casein sodium salt from bovine milk (ex Sigma Aldrich)
Polymeric Blends:
  100% sodium caseinate
  80/20 wt-ratio sodium caseinate/PVA homopolymer
  60/40 wt-ratio sodium caseinate/PVA homopolymer
  50/50 wt-ratio sodium caseinate/PVA homopolymer
  40/80 wt-ratio sodium caseinate/PVA homopolymer
  20/80 wt-ratio sodium caseinate/PVA homopolymer
  100% PVA homopolymer Water soluble films from the respective polymer blends have been prepared following the process detailed herein:
  Polymer resins/powders are dosed in demineralized water to prepare a 15% solution. Plasticizers and other additives were added according to the ratios. The mixture is stirred in a 50 mL glass bottle at 200 rpm. The solution is heated at 80° C. for 4 hours in a propylene glycol bath with reflux.
  Polymer is well-dissolved in water making a homogeneous solution, and air bubbles were driven by sonication and vacuum;
  The homogeneous solution is poured onto a treated glass support (ClSi(CH$_3$)$_3$ in CHCl$_3$);
  The solution is spread into a thin layer using a film applicator with wet gap in the range of 250 μm to 350 μm;
  The resulted film is left standing there at ambient condition (22° C., 35% RH) over night;
  The dried film is peeled off from the support.

Test Results:
  Table 1 reports the average film rupture time (seconds), the average % film dissolution and the average % tensile strain at break values for the water soluble films prepared from the polymer blends listed above following the film making process described herein. From these results it can clearly be seen that water-soluble films based on sodium caseinate-polyvinyl alcohol homopolymer blends according to the invention demonstrate a higher resistance to premature disintegration upon accidental exposure to water (e.g. delayed initial film rupture) at a significantly improved film dissolution profile (e.g. higher % dissolution) compared to water soluble films lacking the sodium caseinate as part of their water soluble polymer blend hence outside the scope of the invention. These sodium caseinate-polyvinyl alcohol homopolymer blends according to the invention also demonstrate suitable mechanical properties to enable film deformation (% tensile strain at break>150%).

TABLE 1

| Sodium caseinate/PVA homopolymer wt-ratio | 100/0 | 80/20 | 60/40 | 50/50 | 40/60 | 20/80 | 0/100 |
|---|---|---|---|---|---|---|---|
| Avg rupture time (s) | 48 s | 67 s | n.m.* | 59 s | 57 s | 44 s | 42 s |
| Avg % film dissolution | 100% | 100% | 92% | 84% | 71% | 48% | 42% |
| Avg % Tensile Strain at break | 7% | 151% | 171% | 277% | 282% | 388% | 398% |

* Not measured

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

What is claimed is:

1. A water-soluble unit dose article comprising a water-soluble film, wherein the water-soluble film comprises a water-soluble polymer, wherein the water-soluble polymer comprises a blend of a caseinate polymer and a polyvinyl alcohol homopolymer,
  wherein the polyvinyl alcohol homopolymer has an average percentage degree of hydrolysis of from about 75% to about 100%, and
  wherein the polyvinyl alcohol homopolymer has an average viscosity of from about 1 to about 30 mPas, wherein the viscosity is measured as a 4% aqueous solution in demineralized water at 20° C.; a treatment composition, and at least one internal compartment, wherein the treatment composition is contained within the at least one internal compartment.

2. The water-soluble unit dose article according to claim 1, wherein the weight ratio of caseinate polymer to polyvinylalcohol homopolymer is between about 25:75 and about 95:5.

3. The water-soluble unit dose article according to claim 1, wherein the water-soluble polymer is present between about 50% and about 95% by weight of the film.

4. The water-soluble unit dose article according to claim 1, wherein the film comprises a non-aqueous plasticizer.

5. The water-soluble unit dose article according to claim 4, wherein the non-aqueous plasticizer is selected from the group consisting of polyols, sugar alcohols, and mixtures thereof.

6. The water-soluble unit dose article according to claim 5, wherein the non-aqueous solvent is selected from the group consisting of glycerol, 1,2-propanediol, dipropylene glycol, 2-methyl-1,3-propanediol, trimethylolpropane, triethyleneglycol, polyethyleneglycol, sorbitol, and mixtures thereof.

7. The water-soluble unit dose article according to claim 4 wherein the film comprises between about 5% and about 50%, by weight of the film, of the non-aqueous plasticizer.

8. The water-soluble unit dose article according to claim 1, wherein the caseinate polymer is selected from alkaline metal salts of caseinate.

9. The water-soluble unit dose article according to claim 1, wherein the polyvinyl alcohol homopolymer has an average percentage degree of hydrolysis of from about 80% to about 95%.

10. The water-soluble unit dose article according to claim 1, wherein the polyvinyl alcohol homopolymer has an average viscosity of from about 5 to about 25 mPas, wherein the viscosity is measured as a 4% aqueous solution in demineralized water at 20° C.

11. The water-soluble unit dose article according to claim 1, wherein the water-soluble film comprises a surfactant in an amount between about 0.1% and about 2.5%, by weight of the water-soluble film.

12. The water-soluble unit dose article according to claim 1, wherein the water-soluble film comprises a residual moisture content of from about 5% to about 10%, by weight of the film, as measured by Karl Fischer titration.

13. The water-soluble unit dose article according to claim 1, wherein the water-soluble film has a thickness of between about 30 μm and about 100 μm.

14. The water-soluble unit dose article according to claim 1, wherein the treatment composition is selected from laundry detergent composition, laundry softening composition, automatic dishwashing composition, hard surface cleaning composition or a mixture thereof.

15. The water-soluble unit dose article according to claim 14, wherein the treatment composition is a liquid, a powder, or a mixture thereof.

16. The water-soluble unit dose article according to claim 14, wherein the treatment composition comprises a non-soap surfactant, wherein the non-soap surfactant is selected from the group consisting of anionic non-soap surfactants, non-ionic surfactants, and mixtures thereof.

17. The water-soluble unit dose article according to claim 16, wherein the treatment composition comprises between about 10% and about 60%, by weight of the treatment composition, of the non-soap surfactant.

18. The water-soluble unit dose article according to claim 14, wherein the treatment composition comprises less than about 15%, by weight of the treatment composition, of water.

19. The water-soluble unit dose article according to claim 14, wherein the treatment composition comprises between about 10% and about 40%, by weight of the treatment composition, of a non-aqueous solvent.

* * * * *